(12) United States Patent
Chen

(10) Patent No.: US 11,093,047 B2
(45) Date of Patent: *Aug. 17, 2021

(54) SYSTEM AND METHOD FOR CONTROLLING A USER EXPERIENCE

(71) Applicant: COMCAST CABLE COMMUNICATIONS, LLC, Philadelphia, PA (US)

(72) Inventor: Michael A. Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,544

(22) Filed: Apr. 7, 2020

(65) Prior Publication Data

US 2020/0341555 A1 Oct. 29, 2020

Related U.S. Application Data

(63) Continuation of application No. 16/267,096, filed on Feb. 4, 2019, now Pat. No. 10,664,062, which is a continuation of application No. 15/354,576, filed on Nov. 17, 2016, now Pat. No. 10,241,586, which is a continuation of application No. 13/469,891, filed on May 11, 2012, now Pat. No. 9,619,036.

(51) Int. Cl.
*G06F 3/01* (2006.01)
(52) U.S. Cl.
CPC .................... *G06F 3/017* (2013.01)

(58) Field of Classification Search
CPC ...................................................... G06F 3/017
USPC .......................................... 345/156, 170–178
See application file for complete search history.

(56) References Cited

U.S. PATENT DOCUMENTS

| | | |
|---|---|---|
| 5,594,469 A | 1/1997 | Freeman et al. |
| 5,714,698 A | 2/1998 | Tokioka et al. |
| 5,862,256 A | 1/1999 | Zetts et al. |
| 6,002,808 A | 12/1999 | Freeman |
| 6,128,003 A | 10/2000 | Smith et al. |
| 6,249,606 B1 | 6/2001 | Kiraly et al. |
| 6,256,400 B1 | 7/2001 | Takata et al. |
| 6,804,396 B2 | 10/2004 | Higaki et al. |
| 7,365,737 B2 | 4/2008 | Marvit et al. |
| 7,372,993 B2 | 5/2008 | Lagardere et al. |
| 7,614,019 B2 | 11/2009 | Rimas Ribikauskas et al. |
| 7,665,041 B2 | 2/2010 | Wilson et al. |
| 7,761,814 B2 | 7/2010 | Rimas-Ribikauskas et al. |
| 8,073,198 B2 * | 12/2011 | Marti ..................... G06F 3/011 382/103 |
| 9,619,036 B2 | 4/2017 | Chen |

(Continued)

*Primary Examiner* — Tony O Davis
(74) *Attorney, Agent, or Firm* — Ballard Spahr LLP

(57) ABSTRACT

System and methods for controlling a user experience are described. In an aspect, an interface can comprise an interface device for rendering content to a user, a sensor having a gesture zone associated therewith configured to detect a dexterous gesture of a user within the gesture zone and generate a sensor signal representing the dexterous gesture. A processor may be provided in communication with the sensor and the interface device. The processor receives the sensor signal, analyzes the sensor signal to determine a control action associated with the detected dexterous gesture of the user, and configures the user interface based upon the determined control action of the user.

20 Claims, 8 Drawing Sheets

(56) References Cited

U.S. PATENT DOCUMENTS

| | | |
|---|---|---|
| 9,715,826 B1 | 7/2017 | Wu |
| 10,241,586 B2 | 3/2019 | Chen |
| 10,425,780 B1* | 9/2019 | Devaraj ............... H04W 8/186 |
| 2002/0006222 A1* | 1/2002 | Inagaki ............. G06K 9/00335 382/181 |
| 2002/0041327 A1* | 4/2002 | Hildreth ................. G06T 7/593 348/42 |
| 2003/0020811 A1 | 1/2003 | Hunter |
| 2004/0155870 A1* | 8/2004 | Middleton ............ G06F 1/1626 345/173 |
| 2004/0189720 A1 | 9/2004 | Wilson et al. |
| 2004/0193413 A1 | 9/2004 | Wilson et al. |
| 2005/0030291 A1* | 2/2005 | Yanagisawa .......... G06F 3/0418 345/173 |
| 2005/0088409 A1* | 4/2005 | Van Berkel ............ G06F 3/017 345/157 |
| 2005/0210418 A1 | 9/2005 | Marvit et al. |
| 2006/0010400 A1 | 1/2006 | Dehlin |
| 2006/0136846 A1 | 6/2006 | Im et al. |
| 2007/0082706 A1 | 4/2007 | Campbell |
| 2007/0241926 A1 | 10/2007 | Chen |
| 2008/0013826 A1 | 1/2008 | Hillis et al. |
| 2008/0059578 A1 | 3/2008 | Albertson |
| 2008/0129686 A1* | 6/2008 | Han ...................... G06F 3/0488 345/156 |
| 2008/0244465 A1 | 10/2008 | Kongqiao et al. |
| 2008/0263479 A1* | 10/2008 | Bloem .................. G06F 3/0481 715/863 |
| 2009/0027337 A1 | 1/2009 | Hildreth |
| 2009/0102800 A1* | 4/2009 | Keenan .................. G08C 23/04 345/173 |
| 2009/0103780 A1 | 4/2009 | Nishihara et al. |
| 2009/0109036 A1 | 4/2009 | Schalla |
| 2009/0143141 A1* | 6/2009 | Wells .................. G07F 17/3237 463/37 |
| 2009/0284594 A1 | 11/2009 | Mitsuhashi |
| 2009/0309851 A1 | 12/2009 | Bernstein |
| 2009/0315740 A1 | 12/2009 | Hildreth et al. |
| 2009/0316952 A1 | 12/2009 | Ferren et al. |
| 2010/0090948 A1 | 4/2010 | Oba et al. |
| 2010/0199228 A1 | 8/2010 | Latta et al. |
| 2010/0199230 A1 | 8/2010 | Latta et al. |
| 2010/0219969 A1 | 9/2010 | Christensen |
| 2010/0269072 A1* | 10/2010 | Sakata .................... G06F 3/017 715/863 |
| 2010/0278393 A1 | 11/2010 | Snook et al. |
| 2010/0306713 A1 | 12/2010 | Geisner et al. |
| 2010/0328029 A1 | 12/2010 | Kolek |
| 2011/0063224 A1 | 3/2011 | Vexo |
| 2011/0093820 A1* | 4/2011 | Zhang .................... A63F 13/10 715/863 |
| 2011/0096024 A1 | 4/2011 | Kwak |
| 2011/0119640 A1* | 5/2011 | Berkes .................... G06F 3/017 715/863 |
| 2011/0128555 A1 | 6/2011 | Rotschild et al. |
| 2011/0154266 A1 | 6/2011 | Friend |
| 2011/0173204 A1 | 7/2011 | Murillo et al. |
| 2011/0180709 A1 | 7/2011 | Craddock et al. |
| 2011/0191707 A1 | 8/2011 | Lee et al. |
| 2011/0209088 A1 | 8/2011 | Hinckley et al. |
| 2011/0239139 A1 | 9/2011 | Lee et al. |
| 2011/0243380 A1 | 10/2011 | Forutanpour et al. |
| 2011/0261191 A1 | 10/2011 | Byren et al. |
| 2011/0289456 A1 | 11/2011 | Reville et al. |
| 2012/0103277 A1 | 5/2012 | Klein |
| 2012/0127012 A1 | 5/2012 | Gicklhorn |
| 2012/0127085 A1* | 5/2012 | Stewart ............... G06F 3/03547 345/173 |
| 2012/0169618 A1* | 7/2012 | Rutledge ............ G06F 3/04883 345/173 |
| 2012/0226981 A1 | 9/2012 | Clavin |
| 2012/0263872 A1 | 10/2012 | Park |
| 2012/0295661 A1 | 11/2012 | Kim |
| 2012/0295665 A1 | 11/2012 | Pantfoerder |
| 2012/0306765 A1 | 12/2012 | Moore |
| 2013/0021491 A1 | 1/2013 | Lee et al. |
| 2013/0063364 A1 | 3/2013 | Moore |
| 2013/0073980 A1 | 3/2013 | Amendolagine et al. |
| 2013/0276028 A1 | 10/2013 | Britt, Jr. |
| 2013/0300644 A1 | 11/2013 | Chen |
| 2014/0101578 A1 | 4/2014 | Kwak |
| 2014/0139629 A1 | 5/2014 | Baiyya |
| 2014/0204015 A1* | 7/2014 | Lee ......................... G06F 3/017 345/156 |
| 2014/0211047 A1 | 7/2014 | Lee |
| 2014/0309871 A1* | 10/2014 | Ricci .................. G06K 9/00355 701/36 |
| 2014/0327655 A1* | 11/2014 | Avrahami ............. G06F 1/1694 345/175 |
| 2014/0380187 A1* | 12/2014 | Gardenfors ............. G06F 3/017 715/748 |
| 2015/0054729 A1 | 2/2015 | Minnen |
| 2015/0077336 A1 | 3/2015 | Elangovan |
| 2015/0088283 A1 | 3/2015 | Fiedler |
| 2015/0100926 A1* | 4/2015 | Berkes ............... G06K 9/00335 715/863 |
| 2015/0120965 A1* | 4/2015 | Huang .................... H04W 4/50 710/8 |
| 2015/0147968 A1* | 5/2015 | Friedman .............. H04W 76/14 455/41.2 |
| 2015/0193004 A1 | 7/2015 | Kim |
| 2015/0234460 A1 | 8/2015 | Vie |
| 2015/0341450 A1* | 11/2015 | Reunamaki ........ G06Q 30/0261 705/14.58 |
| 2015/0364037 A1 | 12/2015 | Lee |
| 2016/0026252 A1* | 1/2016 | McCoy .................... G06F 3/017 345/156 |
| 2016/0073439 A1* | 3/2016 | Palin ...................... H04W 76/14 455/41.2 |
| 2016/0112792 A1 | 4/2016 | Lee |
| 2016/0124537 A1 | 5/2016 | Kim |
| 2016/0148294 A1* | 5/2016 | Howard ............... G06F 3/04817 705/26.62 |
| 2016/0150537 A1* | 5/2016 | Jung ...................... H04W 8/005 455/452.1 |
| 2016/0157254 A1* | 6/2016 | Novlan ................. H04W 72/10 370/329 |
| 2016/0224123 A1 | 8/2016 | Antoniac |
| 2016/0328021 A1 | 11/2016 | Lee |
| 2016/0334880 A1 | 11/2016 | Favre |
| 2016/0354285 A1* | 12/2016 | Nolan .................. G06Q 10/109 |
| 2017/0026607 A1 | 1/2017 | Kim |
| 2017/0030999 A1 | 2/2017 | Garner |
| 2017/0038846 A1 | 2/2017 | Minnen |
| 2017/0117891 A1 | 4/2017 | Lohbihler |
| 2017/0142541 A1 | 5/2017 | P |
| 2017/0153710 A1 | 6/2017 | Ahn |
| 2018/0129293 A1 | 5/2018 | Chen |
| 2018/0157333 A1* | 6/2018 | Ross .................... G06F 21/6245 |
| 2018/0292906 A1* | 10/2018 | Kato ......................... G06F 3/01 |
| 2019/0013018 A1 | 1/2019 | Rekstad |
| 2020/0404077 A1* | 12/2020 | Jiang .................. G06F 16/9035 |

* cited by examiner

SYSTEM AND METHOD FOR CONTROLLING A USER EXPERIENCE

CROSS REFERENCE TO RELATED APPLICATIONS

This application is a Continuation of U.S. Non-Provisional application Ser. No. 16/267,096, filed on Feb. 4, 2019, which is a Continuation of U.S. Non-Provisional application Ser. No. 15/354,576, filed on Nov. 17, 2016, and issued as U.S. Pat. No. 10,241,586 on Mar. 26, 2019, which is a Continuation of U.S. Non-Provisional application Ser. No. 13/469,891, filed on May 11, 2012, and issued as U.S. Pat. No. 9,619,036 on Apr. 11, 2017, each of which are herein incorporated by reference in their entireties.

BACKGROUND

Currently, content can be provided to any number of users through any number of devices. Typically, users have different preferences for how to consume content. Current natural input and control systems can interpret movements of a user as control inputs by leveraging wide-angle cameras to sense gross movement, such as an arm swing (e.g., interactive gaming) and full body motion (e.g., presence indicator) for a simple control input. Current systems are imprecise due to, e.g., the scale of motion required (e.g., fine motor movements are not detected). Current control systems and control tools do not provide a sufficient means to automatically personalize a user experience based upon fine motor movements or dexterous gestures.

SUMMARY

It is to be understood that both the following summary and the following detailed description are exemplary and explanatory only and are not restrictive, as claimed. In an aspect, provided are methods and systems for automatically personalizing a user experience based upon one or more user gestures. The systems and methods provided can enable, for example, a device or system to recognize a dexterous gesture and then adjust various parameters that define a user experience based upon the recognized dexterous gesture. In an aspect, provided are methods and systems for detecting course gestures and dexterous gestures and distinguishing between course gestures and dexterous gestures for device control.

In an aspect, provided is a system that can comprise an interface device for rendering or presenting content to a user. As an example, a sensor having a gesture zone associated therewith, can be configured to detect a dexterous gesture of a user within the gesture zone and generate a sensor signal representing the dexterous gesture. As a further example, a processor in communication with the sensor and the interface device, can be configured to receive the sensor signal and analyze the sensor signal to determine a control action associated with the detected dexterous gesture of the user. In an aspect, the processor can be configured to manage, control, and/or configure the user interface based upon the determined control action of the user.

In an aspect, provided is a system that can comprise an interface device for rendering content. As an example, the system can comprise a source of electromagnetic radiation for projecting a gesture zone and a sensor for detecting a position of a dexterous extremity of a user within the gesture zone. As a further example, the sensor can generate a sensor signal representing the position of the dexterous extremity of the user. In an aspect, a processor can be in communication with the sensor and the interface device. As an example, the processor can receive the sensor signal and analyze the sensor signal to determine a control action based upon the position of the dexterous extremity of the user. As a further example, the processor can configure the user interface based upon the determined control action.

In an aspect, provided are methods comprising rendering or presenting content, detecting a dexterous gesture of a user within a gesture zone, and determining a control action associated with the detected dexterous gesture of the user. As an example, a user interface can be configured based upon the determined control action of the user.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
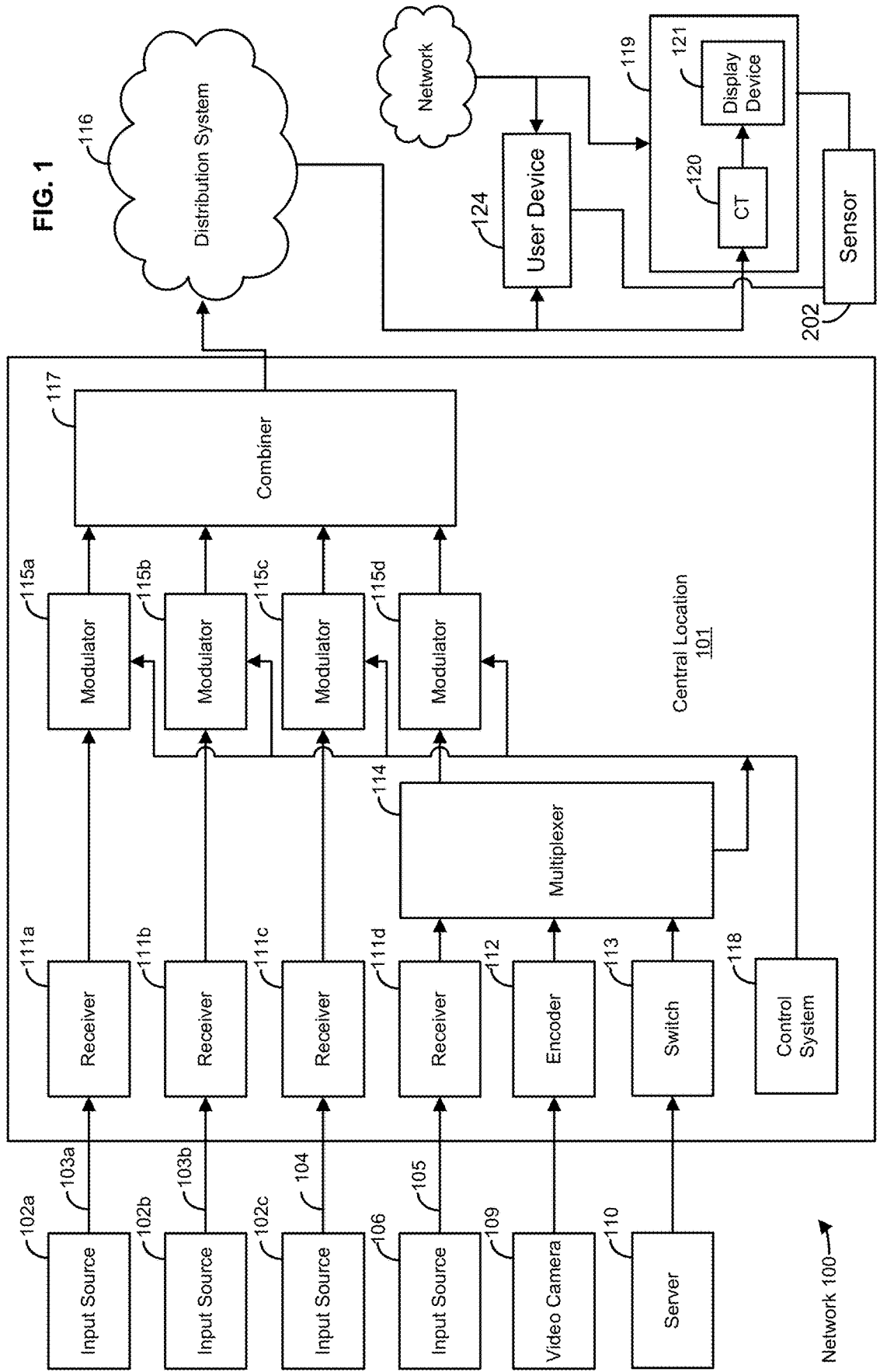
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, a system for rendering a user experience can be controlled based upon a dexterous gesture of one or more users.

FIG. 1 illustrates various aspects of an exemplary network environment in which the present methods and systems can operate. The present disclosure relates to methods and systems for automatically personalizing a user experience. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, headend, etc.), which can receive content (e.g., data, input programming, and the like) from multiple sources. The central location 101 can combine content from the various sources and can distribute the content to user (e.g., subscriber) locations (e.g., location 119) via distribution system 116.

In an aspect, the central location 101 can create content or receive content from a variety of sources 102*a*, 102*b*, 102*c*. The content can be transmitted from the source to the central location 101 via a variety of transmission paths, including wireless (e.g. satellite paths 103*a*, 103*b*) and terrestrial (e.g., fiber optic, coaxial path 104). The central location 101 can also receive content from a direct feed source 106 via a direct line 105. Content may also be created at the central location 101. Other input sources can comprise capture devices such as a video camera 109 or a server 110. The signals provided by the content sources can include, for example, a single content item or a multiplex that includes several content items.

The central location 101 can comprise one or a plurality of receivers 111*a*, 111*b*, 111*c*, 111*d* that are each associated with an input source. In an aspect, the central location 101 can create and/or receive applications, such as interactive application, for example. For example, MPEG encoders such as encoder 112, are included for encoding local content or a video camera 109 feed. A switch 113 can provide access to server 110, which can be, for example, a pay-per-view server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators, 115*a*, 115*b*, 115*c*, and 115*d*, for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. In an aspect, the distribution system 116 can be in communication with an advertisement system for integrating and/or delivering advertisements to user locations. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, there may be an interface device 120 that may comprise a decoder, a gateway or communications terminal (CT) or a mobile user device that can decode, if needed, the signals for display on a display device 121, such as a television, mobile device, a computer monitor, or the like. Those skilled in the art will appreciate that the signal can be decoded in a variety of equipment, including a wireless device, CT, a fixed or mobile computing device, a TV, a monitor, or satellite receiver. In an exemplary aspect, the methods and systems disclosed can be located within, or performed on, one or more wireless devices, CT's 120, display devices 121, central locations 101, DVR's, home theater PC's, and the like.

In an aspect, user location 119 is not fixed. By way of example, a user can receive content from the distribution system 116 on a mobile device such as a laptop computer, PDA, smart phone, GPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating an audio or visual feedback, tactile feedback, and the like. However, other content can be rendered via the user device 124. In an aspect, the user device 124 can be a CT, a set-top box, content receiver, a television, a fixed or mobile computing device, a smart phone, a laptop, a tablet, a multimedia playback device, a portable electronic device, and the like. As an example, the user device 124 can be an Internet protocol compatible device for receiving signals via a network such as the Internet or some other communications network for providing content to the user. As a further example, other display devices and networks can be used. In an aspect, the user device 124 can be a widget or a virtual device for displaying content in a picture-in-picture environment such as on the display device 121.

In an aspect, control devices, measurement devices, and other equipment can be in communication with one or more of the CT 120 and the user device 124. As an example, a controller can be used to manage the functions associated with the CT 120 and/or user device 124. As a further example, a sensor (e.g., sensor 202 in FIG. 2) or measurement device can capture user-provide input for controlling one or more functions of the CT 120, the user device 124, or other devices. In an aspect, a system can be configured to provide a user experience based upon a dexterous gesture of one or more users.

As described in greater detail below, a system for rendering a user experience can be controlled by a dexterous gesture of one or more users. In an aspect, the user experience can comprise a visual and/or audible content for user consumption. As an example, the user experience can comprise environmental characteristics such as lighting, temperature, tactile feedback, and/or other sensory feedbacks.

Figure 2:
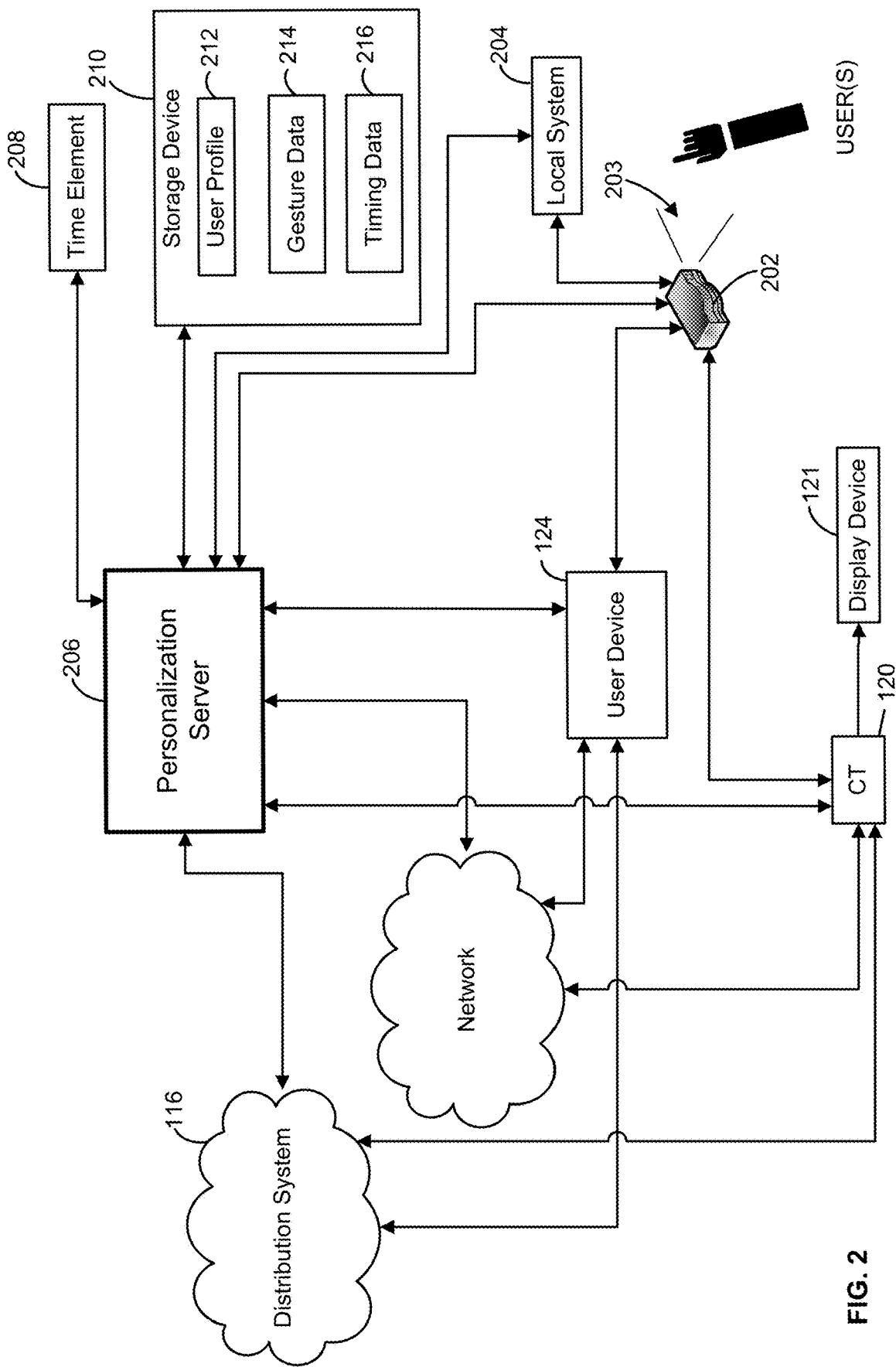
FIG. 2 is a block diagram of an exemplary system.

FIG. 2 illustrates various aspects of an exemplary network and system in which some of the disclosed methods and systems can operate. As an example, the distribution system 116 can communicate with the CT 120 (or other user device) via, for example, a linear transmission. Other network and/or content sources can transmit content to the CT 120. As a further example, the distribution system 116 can transmit signals to a video-on-demand (VOD) system, such as VOD pump or network digital video recorder pump for processing and delivery of data or content to the CT 120. Other content distribution systems, content transmission systems, and/or networks can be used to transmit content signals to the CT 120.

In an aspect, the user device 124 can receive content from the distribution system 116, an Internet protocol network such as the Internet, and/or a communications network, such as a cellular network, for example. Other network and/or content sources can transmit content to the user device 124. As an example, the user device 124 can receive streaming or file-based data, audio and/or video for playback to the user. As a further example, the user device 124 can receive user experience (UX) elements such as widgets, applications, and content via a human-machine interface. In an aspect, user device 124 can be disposed inside or outside the user location (e.g., user location 119).

In an aspect, a sensor 202 or a combination of multiple sensors (e.g., disposed in proximity, at the same location, and/or remote to one other) can be configured to determine (e.g., capture, retrieve, sense, measure, detect, extract, or the like) information relating to one or more users. As an example, the sensor 202 can be configured to determine the presence of one or more users within a field of view of the sensor 202. As a further example, the sensor 202 can be configured to determine a dexterous gesture of one or more users. In an aspect, a dexterous gesture can be a fine motor gesture using an extremity of the body such as a hand. As an example, a dexterous gesture can comprise a movement of one or more fingers, a position of one or more fingers relative to a reference point, or a sequence of finger positions. As a further example, a dexterous gesture can comprise a millimeter scale movement of a user of an implement (e.g., stylus, ring or rings worn by user, other detectable elements).

The following examples are put forth so as to provide those of ordinary skill in the art with a complete disclosure and description of how the articles, devices and/or methods claimed herein are configured and used, and are intended to be purely exemplary and are not intended to limit the scope of the methods and systems.

In an aspect, the sensor 202 can be configured, for example only, to detect dexterous movements within a finite region or zone having a finite detectable area (e.g., between about 1 square inch and about 4 square inches, between about 1 square inch and about 9 square inches, between about 1 square inch and about 16 square inches, between about 1 square inch and about 25 square inches, between about 1 square inch and about 36 square inches, less than 100 square inches, and other pre-defined ranges). In an aspect, the sensor 202 can be configured, for example only, to detect dexterous movements within a finite region or zone having a finite detectable volumetric space (e.g., between about 1 cubic inch and about 8 cubic inches, between about 1 cubic inch and about 27 cubic inches, between about 1 cubic inch and about 64 cubic inches, between about 1 cubic inch and about 125 cubic inches, between about 1 cubic inch and about 216 cubic inches, less than 1000 cubic inches, and other pre-defined ranges). In an aspect, the sensor 202 can be configured, for example only, to detect dexterous movements within a finite region or zone defined within a finite distance from the sensor (e.g., between contact to about 0.1 millimeter (mm), between contact to about 1 mm, between contact to about 10 mm, between contact to about 20 mm, between contact to about 30 mm, between contact to about 40 mm, less than 50 mm, and other pre-defined ranges). Other movements and positions of various objects can be determined. In an aspect, movements beyond a pre-defined threshold can be filtered out and not considered as dexterous gestures.

In an aspect, the sensor 202 can comprise one or more of a camera, stereoscopic camera, close-filed camera, visual sensor, thermal sensor, infrared sensor, biometric sensor, user tracking device, RF sensor, and/or any other device for determining a user state or condition. The sensor 202 can determine a user state or condition to a level of detail necessary to distinguish dexterous movement. For example, the sensor 202 can detect movement on at least a millimeter scale. As a further example, movements beyond a pre-defined threshold or zone can be filtered out and not considered as dexterous gestures. In an aspect, the sensor 202 can be configured for one or more of a facial recognition, gesture recognition, body heat analysis, behavioral analysis, eye tracking, head tracking, biometric analysis and/or other means of determining a user characteristic and or a change in a user characteristic. As an example, the sensor 202 can comprise software, hardware, algorithms, processor executable instructions, and the like to enable the sensor 202 to process any data captured or retrieved by the sensor 202. As a further example, the sensor 202 can transmit data captured or retrieved thereby to a device or system in communication with the sensor 202, such as a processor, server, the CT 120, and/or the user device 124. In an aspect, the sensor 202 can be configured to project electromagnetic radiation therefrom. As an example, the electromagnetic radiation can be projected in one or more wavelength bands such as visible or infrared. As a further example, the electromagnetic radiation can be projected having a particular pattern such as a grid or other reference system. In an aspect, a projected grid can comprise an adaptive pattern, wherein the scale or resolution of the grid or reference system can have a higher resolution in positions where motion has been detected (e.g., or other portions of the overall pattern). In this way, a particular area of the projected grid having a high resolution can detect finer movements than an area having a lower resolution. As a further example, one or more markers (e.g., rings, stickers, paint, RFID tags, gloves, etc.) can be disposed on a user (e.g., an extremity of the user) in order to maximize the resolution of detection.

Figure 3A:
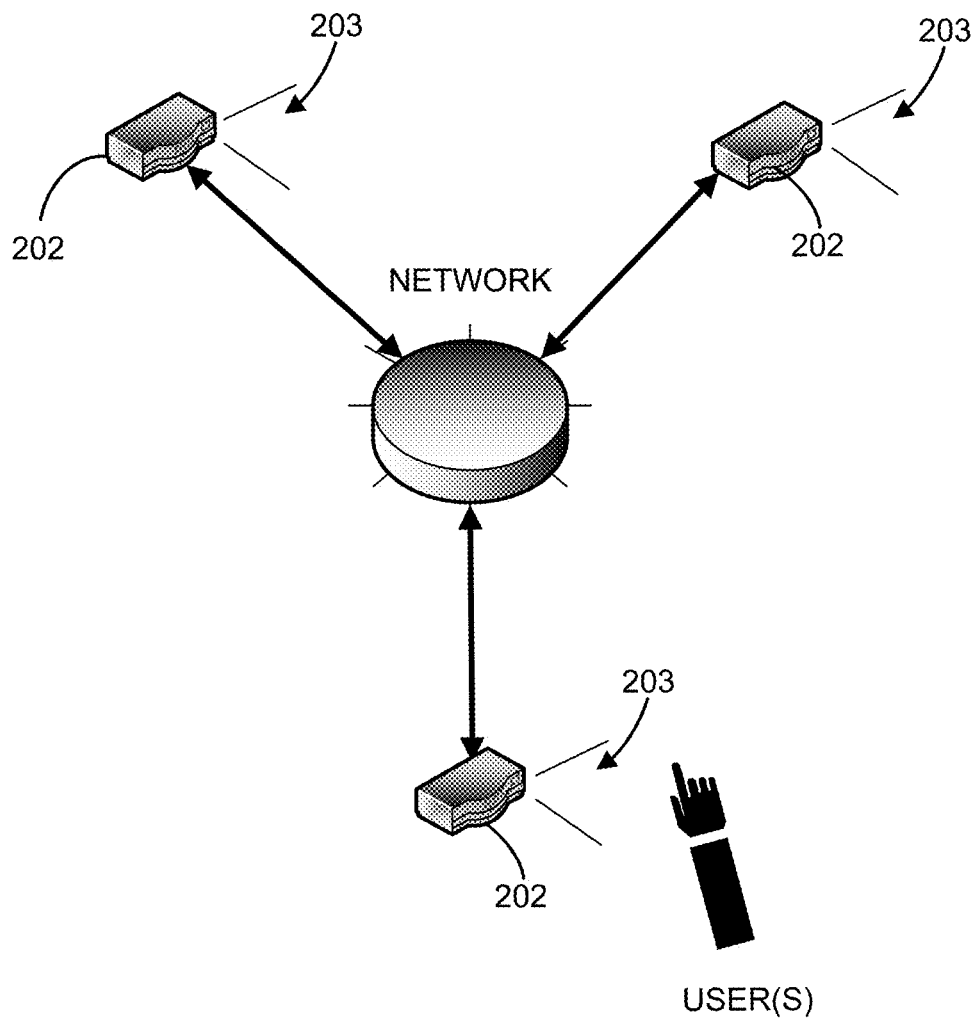
FIG. 3A is a diagram of an exemplary network.

In an aspect, as illustrated in FIG. 3A, a plurality of sensors 202 can be disposed throughout a given area. As an example, each of the sensors 202 can comprise a field of view or gesture zone 203 covering a finite space. In an aspect, dexterous gestures of one or more users are only detected when the user's extremity is within the gesture zone 203 of at least one of the sensors 202. As an example, dexterous motions outside of the gesture zones 203 may not be detected. In an aspect, the gesture zones 203 of two or more sensors 202 can overlap to provide further resolution in detection of a dexterous gesture. As an example, an extremity of a user can be detected by each of three sensors 202 having overlapping gesture zones 203 to provide a triangulated position of the extremity of the user. As a further example, the feedback from each of the sensors 202 can be processed to determine a particular dexterous gesture. In an aspect, a number of sensors 202 can be in communication with each other via a direct connection or through a network to provide collaborative sensing.

Figure 3B:
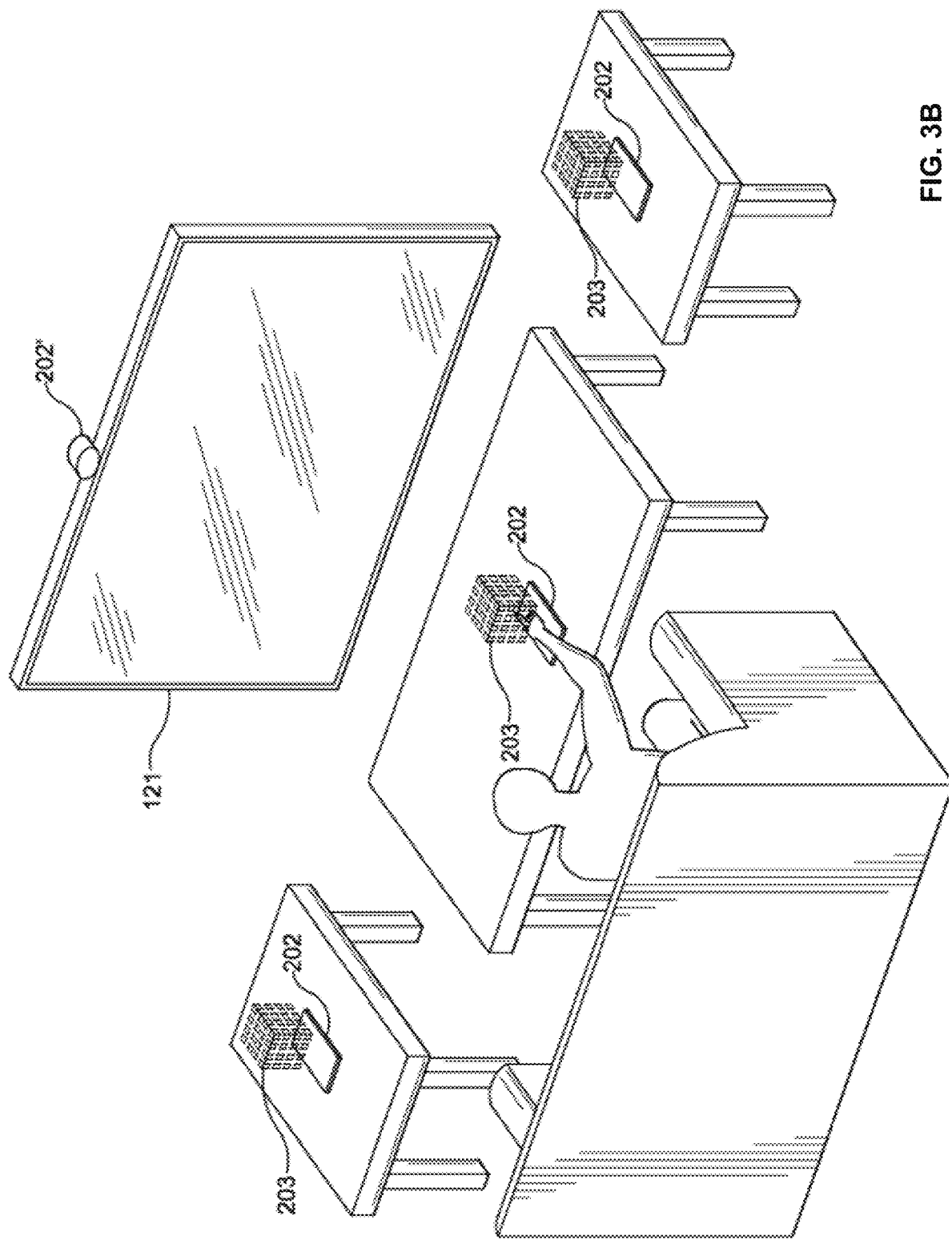
FIG. 3B is a diagram of an exemplary system.

In FIG. 3B, a plurality of sensors 202 can be disposed throughout a given area. As an example, each of the sensors 202 can comprise a field of view or gesture zone 203 covering a finite space. As a further example, the gesture zone 203 of one or more of the sensors 202 can detect motion in one, two and/or three dimensions. In an aspect, dexterous gestures of one or more users are only detected when the user's extremity is within the gesture zone 203 of at least one of the sensors 202. As an example, dexterous motions outside of the gesture zones 203 may not be detected by sensors 202 configured for dexterous motion. As a further example, coarse sensors 202' can be configured to detect motion on a larger scale (e.g., centimeter scale, foot scale) than the sensors 202 that are configured for dexterous gestures. In an aspect, the gesture zones 203 of two or more sensors 202 can overlap to provide further resolution in detection of a dexterous gesture. As an example, an extremity of a user can be detected by a plurality of sensors 202, 202' to provide a triangulated position of the extremity of the user. As a further example, the feedback from each of the sensors 202 can be processed to determine a particular dexterous gesture. In an aspect, a plurality of sensors 202 can be positioned to detect various regions of a larger detectable space of a coarse gesture sensor 202'. In this way, data from each of the sensors 202, 202' can be analyzed to distinguish dexterous gestures from other gestures such as coarse movements. As an example, waving motion of a user's arm (e.g., coarse gesture) can be distinguished from a small flick of the user's finger (e.g., dexterous gesture). As a further example, the coarse sensor 202' can be disposed adjacent a user device (e.g., CT 120, display device 121, etc.) to detect presence and/or coarse motion relative to the user device, while one or more of the sensors 202, configured for detecting dexterous motion, are spaced from the user device to provide remote detection relative to the user device. In an aspect, a number of sensors 202, 202' can be in communication with each other via a direct connection or through a network to provide collaborative sensing.

Returning to FIG. 2, in an aspect, the sensor 202 can be in communication with user device(s) such as the CT 120 to transmit data to the user device(s) relating to one or more users. The CT 120 or user device can also receive user-related data indirectly from the sensor 202, such as via a processor, a server, a control device, or the like. As an example, the sensor 202 can be disposed within a pre-determined proximity of the CT 120 and/or the display device 121 to determine information (e.g., a dexterous gesture) relating to one or more users within the pre-determined proximity of the CT 120 and/or display device 121. Accordingly, the CT 120 can be configured to control a user experience being rendered thereby in response to data received from the sensor 202 and based upon determined characteristics (e.g., dexterous gesture) of the one or more users within the pre-determined proximity of the CT 120. However, the sensor 202 can be disposed in any location relative to the CT 120 and/or display device 121.

In an aspect, when a user provides a dexterous gesture within a gesture zone 203, e.g., field of view of the sensor 202, data relating to the dexterous gesture can be communicated to the CT 120. Accordingly, the user experience being rendered by the CT 120 and/or on the display device 121 can be modified to reflect a control action associated with the detected dexterous gesture. As an example, a movement of a finger along a substantially horizontal plane can be associated with a control action for changing a content channel (e.g., left-to-right movement can be channel up, right-to-left movement can be channel down). As a further example, a relative position of the index finger and the thumb of a user (e.g., emulating the pinching motion around a conventional volume knob) can indicate a control action for changing the volume of audio being rendered. Other movements, gestures, and positions can be detected to control a user experience.

In an aspect, the sensor 202 can be in communication with the user device 124 to transmit data to the user device 124 relating to one or more users. However, the user device 124 can receive user-related data indirectly from the sensor 202 such as via a processor, a server, a control device, or the like. As an example, the sensor 202 can be disposed on, in, or within a pre-determined proximity of the user device 124 to determine information (e.g., dexterous gesture) relating to one or more users within the pre-determined proximity of the user device 124. Accordingly, the user device 124 can be configured to control a user experience being rendered thereby in response to data received from the sensor 202 and based upon determined characteristics (e.g., dexterous gesture) of the one or more users within the pre-determined proximity of the user device 124. However, the sensor 202 can be disposed in any location relative to the user device 124.

In an aspect, when a user provides a dexterous gesture within a gesture zone 203, e.g., field of view of the sensor 202, data relating to the dexterous gesture can be communicated to the user device 124. Accordingly, the user experience being rendered by the user device 124 can be modified to reflect a control action associated with the detected dexterous gesture. As an example, a movement of a finger in the shape of an "X" can be associated with a control action for power on/off of the user device 124. As a further example, a relative position of the index finger and the thumb of a user (e.g., emulating a flicking motion) can indicate a control action for transmitting content (e.g., images, videos, audio files) from the user device 124 to another device such as a display device or storage device. In an aspect, the user device 124 (e.g., and/or other devices) can comprise software for analyzing the dexterous gestures detected and executing the associated control actions. Other movements, gestures, and positions can be detected to control a user experience.

In an aspect, the sensor 202 can be in communication with a local system 204 such as a home security system, surveillance system, HVAC system, lighting system, and/or device or system disposed in a location (e.g., user location 119, or other location). In an aspect, the sensor 202 can be in communication with the local system 204 to transmit to the local system 204 data relating to one or more users. However, the local system 204 can receive user-related data (e.g., representing dexterous gestures) indirectly from the sensor 202 such as via a processor, a server, a control device, or the like. As an example, the sensor 202 can be disposed on, in, or within a pre-determined proximity of the local system 204 to determine information relating to one or more users within the pre-determined proximity of the local system 204. Accordingly, the local system 204 can be configured to control a user experience being rendered thereby in response to data received from the sensor 202 and based upon determined characteristics (e.g., dexterous gestures) of the one or more users within the pre-determined proximity of the local system 204. However, the sensor 202 can be disposed in any location relative to the user device 124. In an aspect, the local system 204 can be configured to transmit information relating to the parameters and settings of the local system 204. For example, the sensor 202 can receive information from an HVAC system relating to the current temperature of a given room. Other systems and parameters can be controlled such as parameters of security system, home automation (lights on/off, blinds up/down, smart home parameters, etc.). Other devices, processors, and the like can be in communication with the local system 204 to send and receive information there between.

In an aspect, the local system 204 can be configured to control the temperature and lighting of a particular room in response to the user experience preferences and/or dexterous gestures of a particular user that is detected in the room. As an example, a movement of a finger in the shape of an "T" can be associated with a control action for initiating a temperature control mode of the local system 204. As a further example, once the temperature control mode is initiated, a follow-up motion such as a movement of a finger along a horizontal plane can be associated with a control action for increasing or decreasing the temperature. In an aspect, a movement of a finger in the shape of an "T" can be associated with a control action for exiting a temperature control mode of the local system 204. In an aspect, the local system 204 (e.g., and/or other devices) can comprise software for analyzing the dexterous gestures detected and executing the associated control actions. Other movements, gestures, and positions can be detected to control a user experience.

In an aspect, a personalization server 206 can be in communication with one or more of the distribution system 116, the CT 120, the user device 124, the local system 204, the Internet or other network, and/or a communication network to receive information relating to content being delivered to a particular user. As an example, the personalization server 206 can comprise software, virtual elements, computing devices, router devices, and the like to facilitate communication and processing of data. In an aspect, the personalization server 206 can be disposed remotely from the user location 119. However, the personalization server 206 can be disposed anywhere, including at the user location 119 to reduce network latency, for example.

In an aspect, the personalization server 206 can be configured to receive and process user data from the sensor 202 to determine a dexterous gesture, a coarse or gross gesture, and/or a user state based upon the data received from the sensor 202. As an example, the personalization server 206 can be configured for one or more of a facial recognition, gesture recognition, body heat analysis, behavioral analysis, eye tracking, head tracking, biometric analysis and/or other means of determining a user characteristic and or a change in a user characteristic. As an example, one or more of the sensor 202 and the personalization server 206 can comprise software, hardware, algorithms, processor executable instructions, and the like to process any data captured or retrieved by the sensor 202.

In an aspect, the personalization server 206, or processor configured to receive data from the sensor 202, can be configured to receive data from the sensor 202 and identify which device, of a plurality of controllable devices, the user wishes to control. For example, if there are two televisions in the house that are on at the same time, the television closest in proximity to the sensor 202 detecting user motion can be selected to be controlled by the gestures detected by the sensor 202. As a further example, a user can specify alternate devices by gesture.

In an aspect, the personalization server 206 can be configured to receive data from one or more sensors 202 and can analyze the received data to determine a particular action associated with the received data (e.g., representing a detected motion). As an example, the personalization server 206 can be configured to learn repeated behavior and/or gestures of a particular detected user (e.g., user profile) in order to provide a customized user experience, as described in further detail below.

In an aspect, a time element 208 can be in communication with (or be incorporated into) at least the personalization server 206 to provide a timing reference thereto (e.g., timing references to timing/scheduling data in other content, such as advertisements or other related content). As an example, the time element 208 can be a clock. As a further example, the time element 208 can transmit information to the personalization server 206 for associating a time stamp with a particular event or user data received by the personalization server 206. In an aspect, the personalization server 206 can cooperate with the time element 208 to associate a time stamp with events having an effect on content delivered to the CT 120 and/or the user device 124, such as, for example, a channel tune, a remote tune, remote control events, playpoint audits, playback events, program events including a program start time and/or end time and/or a commercial/intermission time, and/or playlist timing events, and the like or other types of events. In an aspect, the personalization server 206 can cooperate with the time element 208 to associate a time stamp with user events, such as registered or learned gestures of a particular user.

In an aspect, a storage media or storage device 210 can be in communication with the personalization server 206 to allow the personalization server 206 to store and/or retrieve data to/from the storage device 210. As an example, the storage device 210 can store information relating to user profiles 212, user preference data or gesture data 214, timing data 216, device configurations, and the like. In an aspect, the storage device 210 can be a single storage device or may be multiple storage devices. As an example, the storage device 210 can be a solid state storage system, a magnetic storage system, an optical storage system or any other suitable storage system or device. Other storage devices can be used and any information can be stored and retrieved to/from the storage device 210 and/or other storage devices.

In an aspect, each of a plurality of user profiles 212 can be associated with a particular user. As an example, the user profiles 212 can comprise user identification information to distinguish one user profile 212 from another user profile 212. As a further example, the user profiles 212 can comprise user preference data or gesture data 214 based upon one or more of user preferences, registered gestures, learned gestures, and user-provided input.

In an aspect, the gesture data 214 can comprise information relating to the preferred user experience settings for a particular user and the associated gestures. As an example, gesture data 214 can comprise learned or pre-programmed gestures and control actions associated with the gestures. As a further example, a user can store a particular dexterous gesture and associated one or more control actions with the stored dexterous gesture. Accordingly, when the dexterous gesture is subsequently detected by the sensor 202, the associated control action can be retrieved and executed.

In an aspect, timing data 216 can be associated with a particular user profile 212 for defining a temporal schedule. As an example, a user associated with one of the user profiles 212 may habitually watch action movies in low light conditions on the weekends. Accordingly, the timing data 216 can represent the learned content consuming pattern from the user and can apply such preferences to similar detected events in time and context, thereby allowing the personalization server 206 to learn particular user gestures.

As described in greater detail below, a method for controlling a device can comprise detecting a dexterous gesture of one or more users in a particular area or gesture zone and modifying a user experience based upon the detected gesture.

Figure 4:
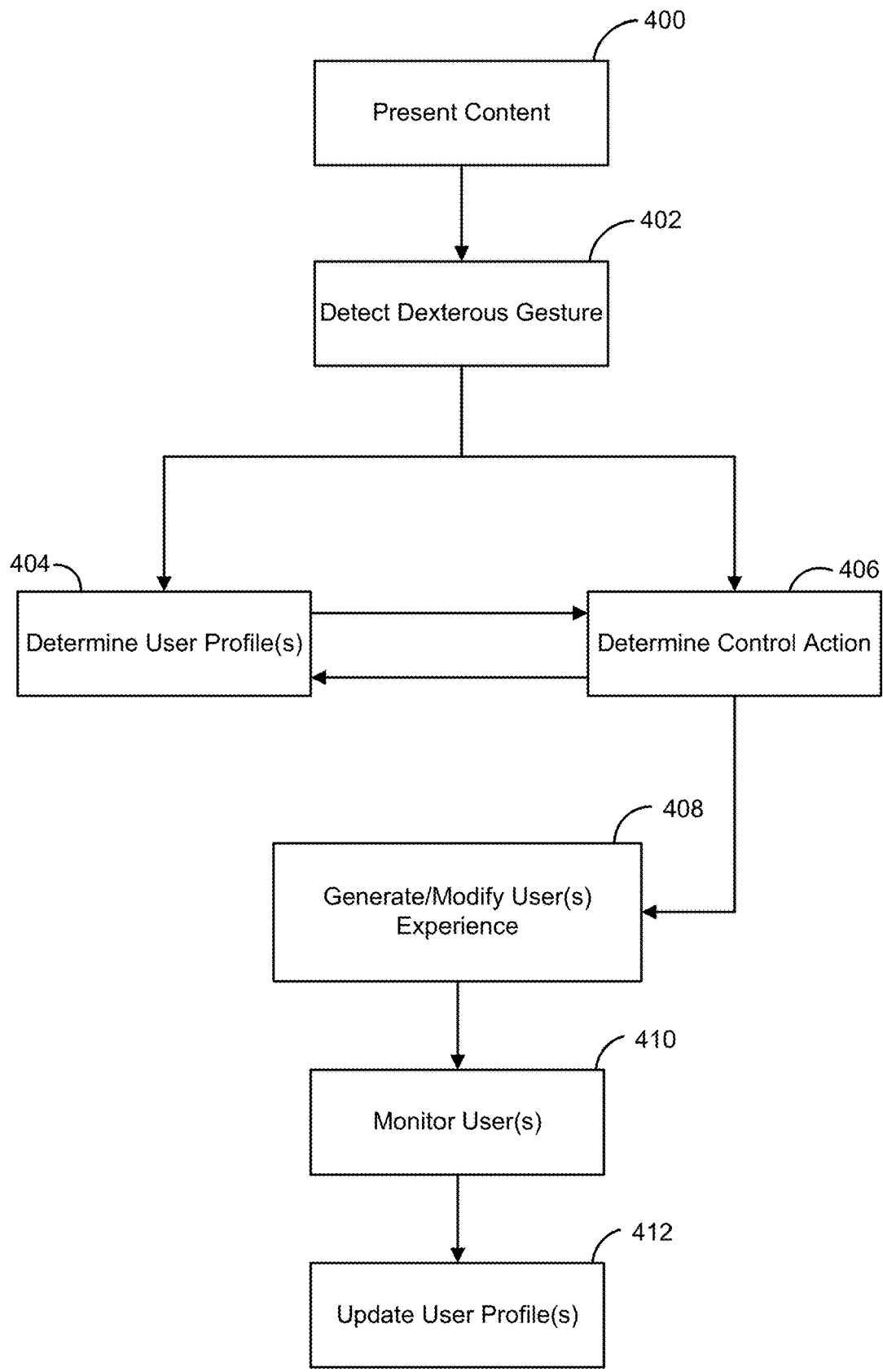
FIG. 4 is a flow chart of an exemplary method.

FIG. 4 illustrates an exemplary method for providing and controlling a user experience. The method illustrated in FIG. 4 will be discussed in reference to FIGS. 1-3, for illustrative purposes only. In step 400, content (e.g., images, audio, video) can be presented (e.g., transmitted via content channel, rendered via a display device and/or audio device). In an aspect, the sensor 202 captures information (e.g., dexterous gestures) relating to one or more users within the field of view (e.g., gesture zone 203) of the sensor 202, in step 402. As an example, the user data can be processed to determine a dexterous gesture of one or more of the users within the field of view of the sensor 202 such as by gesture recognition software. Other techniques can be used to identify a dexterous gesture including direct user query and/or user input that can be stored and processed for later comparison. As a further example, the user data can be compared to stored data in order to determine a dexterous gesture provided by one or more of the users within the field of view of the sensor 202.

In step 404, one or more user profiles are determined (e.g., retrieved, generated, obtained). In an aspect, determining a profile of a user can comprise retrieving one or more user profiles 212 from the storage device 210. As a non-limiting example, the user profile(s) 212 can comprise user-specific gesture data 214 and permissions associated with a particular user. Accordingly, in an aspect, the user data captured by sensor 202 or other device(s) can be processed to identify a particular user, and the user profile 212 associated with the identified user can be retrieved. As a further example, a new user profile 212 can be generated based upon one or more of a user input, a default profile template, and the gesture data collected by the sensor 202. In an aspect, when a user or portion of the user enters the field of view of the sensor 202, the user can be queried to identify himself/herself. As an example, a holding place profile can be created for every user that enters the field of view of the sensor 202. However, the sensor 202 and related processing devices may not have a discrete identifier for the holding place profile until the user provides further information such as a name, token, character, or other discrete identifier. However, other identifiers can be used, such as biometric signatures, voice signatures, retinal signatures, and the like.

In step 406, a control action associated with the detected dexterous gesture of one or more users can be determined. As an example, captured data (e.g., captured by one or more sensors 202) can be processed to determine the specific dexterous gesture within the field of view of the sensor 202 and to determine the control action associated with the specific dexterous gesture. In an aspect, the dexterous gestures determined can be used to generate and/or update one or more of the user profiles 212.

In step 408, a user experience can be generated and/or modified based upon one or more user profiles 212 and dexterous gestures. Other data and/or metrics can be used to generate the user experience. In an aspect, the user experience can comprise a visual and/or audible content for user consumption. As an example, the user experience can comprise environmental characteristics such as lighting, temperature, tactile feedback, and/or other sensory feedbacks.

In an aspect, audio levels of an audio feedback can be modified based on a dexterous gesture such as a movement of a finger. In an aspect, content can be paused based upon the detection of a dexterous gesture such as a finger movement emulating a pause "=" symbol. In an aspect, interest in content, such as setting a favorite or indicating a social media "like," can be registered based upon the detection of a dexterous gesture such as the thumb ascending from a closed first position or changing from horizontal to ascending position to give a "thumbs up;" conversely, disinterest can be registered based upon the detection of a dexterous gesture such as the thumb descending from closed first or rotating from horizontal to descending position to give a "thumbs down." In an aspect, playback speed can be controlled based upon the detection of a dexterous gesture such as repeated clockwise finger motion with a right hand, or repeated counterclockwise finger motion with a left hand. In an aspect, user acceptance can be registered based upon the detection of a dexterous gesture such as the index finger tip or nail touching at or near the tip of the thumb opposite the nail, with other fingers extended. In an aspect, scrolling can be controlled based upon the detection of a dexterous gesture such as lateral motion of at least the index finger with the thumb not extended, perhaps with the magnitude determined in part by the number of moving fingers and/or the resultant angle formed between the moving finger(s) and the palm of the hand. In an aspect, a user can point to a particular device such as one of a plurality of display devices 121, whereby the sensor 202 can detect the pointing gesture and select the display device in alignment with the pointing vector of the user's hand. In this way, a user can select a particular device for subsequent control. Other gestures, movements, and positions can be used to control operations of the system and network.

In step 410, dexterous gestures of one or more users can be monitored such as by using the sensor 202, for example. As an example, a change in characteristics (e.g., a reaction) of the user to a particular user experience and/or a change in behavior can be monitored, and data relating to the reaction/behavior of the user can be used to update the user profile associated with the particular user, as shown in step 412. Accordingly, an associated one of the user profiles 212 can be a dynamic, intelligent, and/or learning profile. As a further example, a user can generate specific gestures that can be stored as part of one or more user profile 212. Other users states, characteristics, behaviors, and reactions can be monitored to update one or more of the user experience and the user profiles 212.

As described in greater detail below, a system for rendering a user experience can be configured to automatically detect a coarse or gross gesture and a dexterous gesture of one or more users and personalize content based upon the gestures of one or more users.

Figure 5:
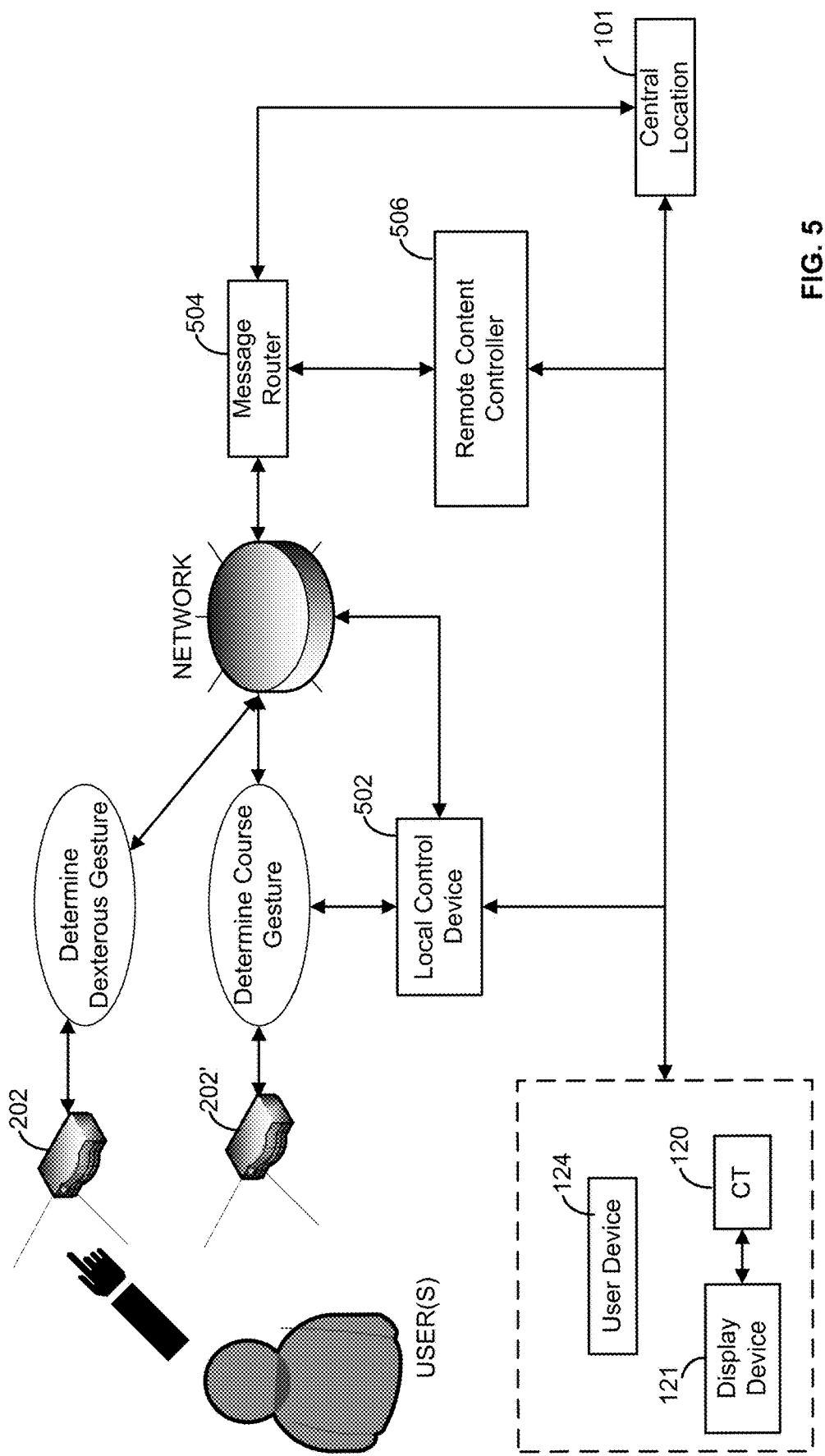
FIG. 5 is a block diagram of an exemplary system.

FIG. 5 illustrates various aspects of an exemplary network and system in which the present methods and systems can operate. In an aspect, the sensor 202 can be configured to determine (e.g., capture, sense, measure, detect, extract, or the like) information relating to gestures of one or more users. As an example, the sensor 202 can be configured to determine a dexterous gesture within a field of view of the sensor 202. As a further example, the sensor 202' can be configured to determine a coarse gesture within a field of view of the sensor 202'. In an aspect, the course gesture can comprise full body motion, limb motion, hand motion, and/or motion that exceed a pre-defined threshold distance. As an example, the pre-defined threshold distance can be any distance. As a further example, the pre-defined threshold distance can be greater than a dimension of a pre-defined dexterous gesture zone.

In an aspect, the sensors 202, 202' can be in communication with a local control device 502 for receiving gesture data from one or more of the sensors 202, 202' to control the user experience provided by one or more of the CT 120 and the user device 124 in response to the detected gesture data. Local control devices can comprise, but are not limited to, infrared remote control devices, RF remote control devices, Bluetooth remote control devices, personal data assistants (PDAs), tablets, web pads, laptops, smart phones, etc. Other device control and content control can be executed by the local content controller 502.

In an aspect, the sensor 202 can be in communication with a message router 504 (e.g., via a local network or a network such as the Internet) for distributing the detected gesture data to downstream devices and/or systems for processing. As an example, the detected gesture data can be transmitted to a remote content controller 506 to control the user experience provided by one or more of the CT 120 and the user device 124 in response to the gesture data. Other device control and content control can be executed by the remote content source and/or controller 506. In an aspect, control messages can be transmitted to the central location 101, for downstream control of content and other functions, for example.

As described in greater detail below, a method for controlling a user experience can comprise detecting a coarse gesture and a dexterous gesture and generating or modifying a user experience based upon the particular detected gesture(s).

Figure 6:
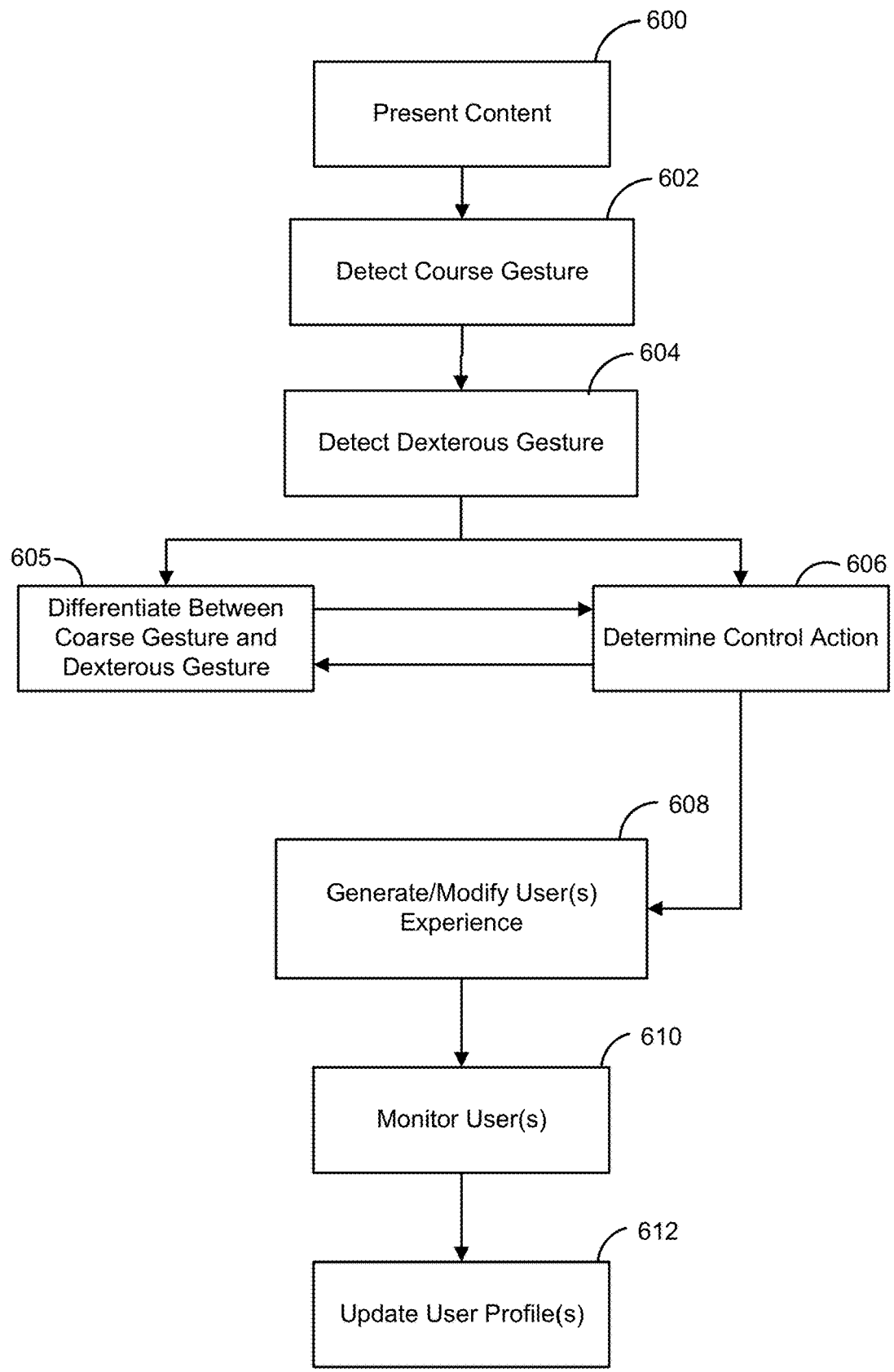
FIG. 6 is a flow chart of an exemplary method.

FIG. 6 illustrates an exemplary method for providing or controlling a user experience. The method illustrated in FIG. 6 will be discussed in reference to FIGS. 1-5, for illustrative purposes only. In step 600, content (e.g., images, audio, video) can be presented (e.g., transmitted, rendered via a display device and/or audio device). In an aspect, in step 602, the sensor 202 captures dexterous gestures relating to one or more users within the field of view (e.g., gesture zone 203) of the sensor 202. As an example, data captured by the sensor 202 can be processed to determine a dexterous gesture of one or more of the users within the field of view of the sensor 202 such as by gesture recognition software. Other techniques can be used to identify a dexterous gesture including direct user query and/or user input that can be stored and processed for later comparison. As a further example, the user data can be compared to stored data in order to determine a dexterous gesture provided by one or more of the users within the field of view of the sensor 202.

In step 604, the sensor 202' captures coarse gestures relating to one or more users within the field of view (e.g., gesture zone 203') of the sensor 202'. As an example, data captured by the sensor 202' can be processed to determine a coarse gesture of one or more of the users within the field of view of the sensor 202' such as by gesture recognition software. Other techniques can be used to identify a coarse gesture, including direct user query and/or user input that can be stored and processed for later comparison. As a further example, the user data can be compared to stored data in order to determine a coarse gesture provided by one or more of the users within the field of view of the sensor 202'.

In step 605, where a coarse gesture and a dexterous gesture are detected, a processor (e.g., local control device, remote control device, central location, computing device) can process data representing the coarse gesture and the dexterous gesture to differentiate between the coarse gesture and the dexterous gesture. As an example, a threshold of movement can be pre-defined, wherein movements that exceed the threshold can be identified as coarse gestures and movements that do not exceed the threshold can be identified as dexterous gestures. As a further example, a gesture zone can be pre-defined to have a field of detection. Accordingly, gestures that extend beyond the gesture zone of one or more of the sensor 202, 202' configured for dexterous gestures can be identified as coarse gestures. As another example, where processing of representative data from sensors 202, 202' indicates probable divergence in the number of discrete regions (e.g. as clasped hands are separated, such that one region becomes two, or as hands come together, such that two regions become one), said divergence can be identified as a coarse gesture. As yet another example, where processing of representative data from sensors 202, 202' indicates sufficient conformity in computed image invariants and sufficient divergence in other properties (e.g. centroid position), this condition may be identifiable as a coarse gesture.

In step 606, a control action associated with one or more of a detected dexterous gesture and a detected coarse gesture of one or more users can be determined. As an example, captured data (e.g., captured by one or more sensors 202, 202') can be processed to determine the specific dexterous gesture within the field of view of one or more of the sensors 202, 202' and to determine the control action associated with the specific dexterous gesture. As a further example, captured data (e.g., captured by one or more sensors 202, 202') can be processed to determine the specific coarse gesture within the field of view of one or more of the sensors 202, 202' and to determine the control action associated with the specific coarse gesture. In an aspect, the dexterous gestures and coarse gestures determined can be used to generate and/or update one or more of the user profiles 212. As an example, from processing of representative data from sensors 202, 202', sufficient divergence in centroid position with sufficient conformity in certain other central moments may indicate an overall translation that is considered as a coarse gesture, while classification of computed image invariants or other feature extractions against parametric models may indicate similarity that is considered a particular dexterous gesture. Note that performance and detection of simultaneous coarse and dexterous gestures is quite possible; for example, a dexterous pinching motion with the thumb and index finger during coarse hand movement up and to the right may indicate a click and drag style operation. In an aspect, a user can use a coarse motion such as a movement of the user's arm to point to a particular device, such as one of a plurality of display devices 121, whereby the coarse sensor 202' can detect the pointing gesture and select the display device in alignment with the pointing vector of the user's arm. In this way, a user can select a particular device for subsequent control based upon dexterous gestures detected by the dexterous sensor 202. Other gestures, movements, and positions can be used to control operations of the system and network.

In step 608, a user experience can be generated and/or modified based upon one or more user profiles 212 and dexterous gestures. Other data and/or metrics can be used to generate the user experience. In an aspect, the user experience can comprise a visual and/or audible content for user consumption. As an example, the user experience can comprise environmental characteristics such as lighting, temperature, tactile feedback, and/or other sensory feedbacks.

In an aspect, audio levels of an audio feedback can be modified based on a dexterous gesture such as a movement of a finger. In an aspect, content can be paused based upon the detection of a dexterous gesture such as a finger movement emulating a pause "=" symbol.

In step 610, dexterous gestures and/or coarse gestures of one or more users can be monitored such as by using one or more of the sensors 202, 202', for example. As an example, a change in characteristics (e.g., a reaction) of the user to a particular user experience and/or a change in behavior can be monitored, and data relating to the reaction/behavior of the user can be used to update the user profile associated with the particular user, as shown in step 612. Accordingly, an associated one of the user profiles 212 can be a dynamic, intelligent, and/or learning profile. As a further example, a user can generate specific gestures that can be stored as part of one or more user profile 212. Other users states, characteristics, behaviors, and reactions can be monitored to update one or more of the user experience and the user profiles 212.

Figure 7:
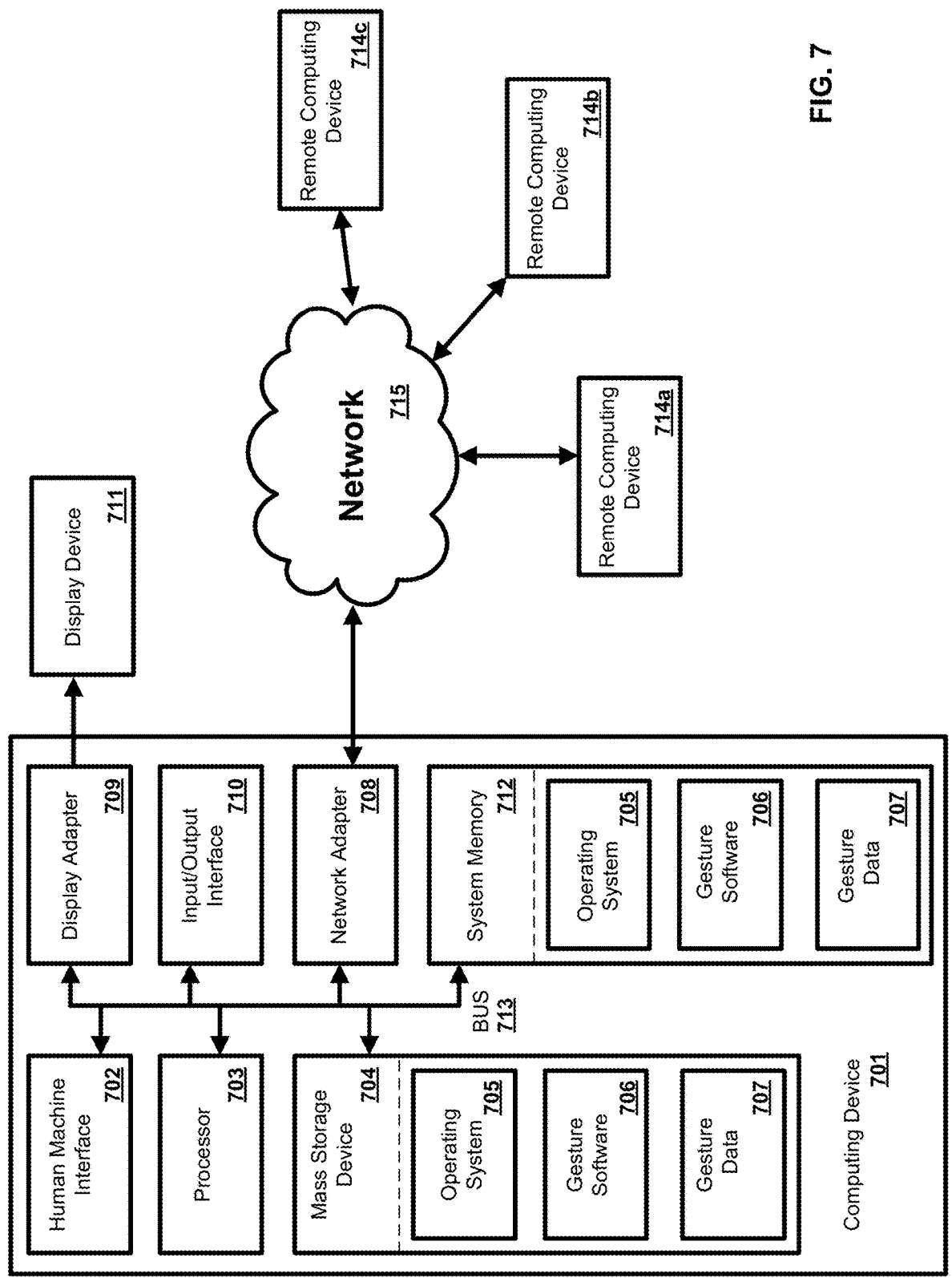
FIG. 7 is a block diagram of an exemplary computing device.

In an exemplary aspect, the methods and systems can be implemented on a computing device such as computing device 701 as illustrated in FIG. 7 and described below. By way of example, server 110 of FIG. 1 can be a computer as illustrated in FIG. 7. Similarly, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 701. The components of the computing device 701 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, gesture software 706, user data and/or gesture data 707, a network adapter 708, system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computing device 701 typically comprises a variety of computer readable media. Exemplary readable media can be any available media that is accessible by the computing device 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as gesture data 707 and/or program modules such as operating system 705 and gesture software 706 that are immediately accessible to and/or are presently operated on by the processing unit 703.

In another aspect, the computing device 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computing device 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and gesture software 706. Each of the operating system 705 and gesture software 706 (or some combination thereof) can comprise elements of the programming and the gesture software 706. Gesture data 707 can also be stored on the mass storage device 704. Gesture data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computing device 701 can have more than one display adapter 709 and the computing device 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computing device 701 via Input/Output Interface 710. Any step and/or result of the methods can be output in any form to an output device. Such output can be any form of visual representation, including, but not limited to, textual, graphical, animation, audio, tactile, and the like. The display 711 and computing device 701 can be part of one device, or separate devices.

The computing device 701 can operate in a networked environment using logical connections to one or more remote computing devices 714a,b,c. By way of example, a remote computing device can be a personal computer, portable computer, smart phone, a server, a router, a network computer, a peer device or other common network node, and so on. Logical connections between the computing device 701 and a remote computing device 714a,b,c can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of gesture software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   receiving, from one or more sensors, motion data indicative of a gesture made by a user;
   storing, in a user profile associated with the user, an association between the gesture and a control action, wherein the control action corresponds to the gesture;
   receiving, from the one or more sensors, further motion data indicative of the gesture;
   selecting, based on a proximity of the user to the one or more sensors, a device from among a plurality of devices; and
   modifying, based on the further motion data and the user profile, a user experience at the device, wherein the device is proximate to the user.

2. The method of claim 1, wherein modifying, based on the further motion data and the user profile, the user experience at the device comprises determining, based on the user profile, the control action.

3. The method of claim 2, further comprising:
   causing the device to apply the control action.

4. The method of claim 1, further comprising:
   determining, based on the motion data, the control action corresponding to the gesture.

5. The method of claim 1, wherein the motion data comprises at least one of: a dexterous gesture or a coarse gesture.

6. The method of claim 1, wherein the motion data is detected by the one or more sensors within a gesture zone, and wherein the method further comprises:
   receiving, from the one or more sensors, second motion data indicative of the gesture made by the user outside the gesture zone; and
   determining, based on the second motion data being detected outside the gesture zone, that the control action is not to be applied.

7. The method of claim 1, further comprising:
   receiving, from the one or more sensors, second motion data indicative of a second gesture made by a second user; and
   storing, in a second user profile associated with the second user, an association between the second gesture and the control action, wherein the control action corresponds to the second gesture.

8. A method comprising:
   receiving, from one or more sensors:
      first motion data and an indication of a control action, wherein the first motion data is indicative of a first gesture made by a first user, and
      second motion data and a further indication of the control action, wherein the second motion data is indicative of a second gesture made by a second user;
   storing, in a first user profile associated with the first user, an association between the first motion data and the control action, wherein the control action corresponds to the first gesture;
   storing, in a second user profile associated with the second user, an association between the second motion data and the control action, wherein the control action corresponds to the second gesture;
   selecting, based on further motion data detected by the one or more sensors, and based on a proximity of a user associated with the further motion data to the one or more sensors, a device from among a plurality of devices; and
   modifying, based on the further motion data, a user experience at the device.

9. The method of claim 8, wherein the user associated with the further motion data comprises the second user, and wherein the method further comprises:
   receiving, from the one or more sensors, the further motion data, wherein the further motion data is indicative of the second gesture;

and
　　determining, based on the further motion data being associated with the second user, and based on the second user profile, that the control action is to be applied.

10. The method of claim 8, wherein the user associated with the further motion data comprises the first user, and wherein the method further comprises:
　　receiving, from the one or more sensors, the further motion data, wherein the further motion data is indicative of the first gesture; and
　　determining, based on the further motion data being associated with the first user, and based on the first user profile, that the control action is to be applied.

11. The method of claim 8, wherein the further motion data comprises one or more user characteristics identifying the first user.

12. The method of claim 11, further comprising:
　　determining, based on the one or more user characteristics, that the further motion data is associated with the first user.

13. The method of claim 8, wherein the control action comprises at least one of: a user device action or a local system action.

14. The method of claim 8, further comprising:
　　receiving, from the one or more sensors, the further motion data, wherein the further motion data is indicative of the first gesture made by the first user outside a gesture zone; and
　　determining, based on the further motion data being detected outside the gesture zone, that the control action is not to be applied.

15. A method comprising:
　　detecting, via one or more sensors, first motion data indicative of a gesture made by a user within a gesture zone;
　　storing, in a user profile associated with the user, an association between the gesture and a control action, wherein the control action corresponds to the first motion data;
　　determining, based on second motion data indicative of the gesture made by the user outside the gesture zone, that the control action is not to be applied;
　　detecting, via the one or more sensors, third motion data indicative of the gesture made by the user within the gesture zone; and
　　selecting, based on the third motion data being detected within the gesture zone, and based on a proximity of the user to the one or more sensors when the third motion data was detected, a device from among a plurality of devices for modifying a user experience.

16. The method of claim 15, wherein the gesture zone comprises a volumetric space.

17. The method of claim 15, further comprising
　　modifying, based on the third motion data and the user profile, the user experience at the device proximate.

18. The method of claim 17, wherein modifying the user experience comprises modifying a playback of content by the device.

19. The method of claim 17, wherein modifying the user experience comprises modifying one or more environmental conditions associated with the device.

20. The method of claim 15, further comprising:
　　detecting, via the one or more sensors, fourth motion data indicative of the control action, wherein the fourth motion data is indicative of a second gesture made by a second user; and
　　storing, in a second user profile associated with the second user, an association between the fourth motion data and the control action, wherein the control action corresponds to the second gesture.

* * * * *